(12) United States Patent
Asher

(10) Patent No.: US 11,301,549 B2
(45) Date of Patent: Apr. 12, 2022

(54) METHOD FOR PERFORMING PASSWORD TRANSITIONS

(71) Applicant: JPMorgan Chase Bank, N.A., New York, NY (US)

(72) Inventor: Adrian Asher, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 16/860,359

(22) Filed: Apr. 28, 2020

(65) Prior Publication Data

US 2021/0334343 A1     Oct. 28, 2021

(51) Int. Cl.
*G06F 21/31*     (2013.01)
*G06F 21/46*     (2013.01)
*H04L 9/30*      (2006.01)
*H04L 29/06*     (2006.01)

(52) U.S. Cl.
CPC ............. *G06F 21/31* (2013.01); *G06F 21/46* (2013.01); *H04L 9/3073* (2013.01); *H04L 63/0846* (2013.01)

(58) Field of Classification Search
CPC ....... G06F 21/31; G06F 21/46; H04L 63/0846
See application file for complete search history.

(56) References Cited

U.S. PATENT DOCUMENTS

| | | | | |
|---|---|---|---|---|
| 5,812,764 | A * | 9/1998 | Heinz, Sr. ............... | G06F 21/31 726/5 |
| 7,950,051 | B1 * | 5/2011 | Spitz ....................... | G06F 21/31 726/6 |
| 8,281,372 | B1 * | 10/2012 | Vidal ...................... | H04L 51/12 726/5 |
| 8,291,470 | B2 * | 10/2012 | Delia ...................... | G06F 21/31 726/2 |
| 8,572,725 | B2 * | 10/2013 | Ma .......................... | G06F 21/46 726/16 |
| 9,996,687 | B1 * | 6/2018 | Dhoot ..................... | G06F 21/31 |
| 10,146,931 | B1 * | 12/2018 | Kronrod ................. | G06F 21/46 |
| 2007/0124807 | A1 * | 5/2007 | Jau ......................... | H04L 9/3226 726/6 |
| 2009/0064297 | A1 * | 3/2009 | Selgas .................. | H04L 63/0846 726/6 |

(Continued)

*Primary Examiner* — James R Turchen
(74) *Attorney, Agent, or Firm* — Greenblum & Bernstein, P.L.C.

(57) ABSTRACT

A method for changing a security credential, such as a password, for secure user authentication with respect to user access to an application is provided. The method includes: receiving, from a vault that is configured to periodically generate and change a credential for accessing the application, a current credential and a first future credential that is designated as a next credential; transmitting, to a user that has access to the vault, the current credential; when a first interval that corresponds to a periodicity of a changing of the credential elapses, receiving, from the vault, a message indicating that the current credential has expired and that the next credential has been redesignated as the current credential, and providing a newly designated next credential, and transmitting, to the user, a message indicating that the previous current credential has expired and providing the redesignated current credential.

20 Claims, 7 Drawing Sheets

(56) References Cited

U.S. PATENT DOCUMENTS

| | | | |
|---|---|---|---|
| 2009/0281816 A1* | 11/2009 | Houga | H04L 63/0846 705/346 |
| 2009/0320108 A1* | 12/2009 | Livingston | G06F 21/31 726/6 |
| 2010/0100948 A1* | 4/2010 | Delia | H04L 63/20 726/6 |
| 2010/0146602 A1* | 6/2010 | Delia | G06F 21/31 726/6 |
| 2012/0060213 A1* | 3/2012 | Childress | G06F 21/31 726/18 |
| 2013/0061301 A1* | 3/2013 | Novak | H04L 63/0846 726/6 |
| 2017/0200002 A1* | 7/2017 | Harris | G06F 21/45 |
| 2020/0112585 A1* | 4/2020 | Keohane | G06F 21/46 |
| 2021/0264017 A1* | 8/2021 | Ferreira | H04L 63/0846 |
| 2021/0279325 A1* | 9/2021 | Harris | G06F 21/31 |

* cited by examiner

METHOD FOR PERFORMING PASSWORD TRANSITIONS

BACKGROUND

1. Field of the Disclosure

This technology generally relates to methods and systems for changing security credentials such as passwords, and more particularly, to methods and systems for generating multiple security credentials, such as passwords, to be used sequentially and provided in advance in order to ensure smooth transitions between successive passwords.

2. Background Information

For many applications, there are security requirements that require the use of credentials, such as passwords, for access, and that also require that the credentials be changed periodically. For such applications, passwords may be generated in advance and stored in a memory or vault.

For a conventional application that uses vaulting for passwords and/or other types of security credentials, there is a race condition that occurs when a password is in the process of being changed, but the new password has not yet been generated and/or stored. In such a circumstance, when the application requests a new password, it may receive an old password or an invalid password, thereby causing a disruption in the availability of the application.

Accordingly, there is a need for a method for generating multiple passwords and/or other types of security credentials to be used sequentially and provided in advance in order to ensure smooth transitions between successive passwords and/or other types of security credentials.

SUMMARY

The present disclosure, through one or more of its various aspects, embodiments, and/or specific features or sub-components, provides, inter alia, various systems, servers, devices, methods, media, programs, and platforms for generating multiple security credentials, such as passwords, to be used sequentially and provided in advance in order to ensure smooth transitions between successive passwords.

According to an aspect of the present disclosure, a method for changing a credential for secure user authentication is provided. The method is implemented by at least one processor that is configured to facilitate user access to an application. The method includes: receiving, from a user, a request for creating an account for accessing the application; transmitting, to the user, a response indicating that the account has been created and prompting the user to obtain access to a vault that is configured to periodically generate and change a credential for accessing the application; receiving, from the vault, a current credential and a first future credential that is designated as a next credential; transmitting, to the user, the current credential; when a request for accessing the application that includes the current credential is received from the user, providing, to the user, access to the application; when a first interval that corresponds to a periodicity of a changing of the credential elapses, receiving, from the vault, a message indicating that the current credential has expired and that the next credential has been redesignated as the current credential, and providing a second future credential that has been designated as the next credential; and transmitting, to the user, a message indicating that the previous current credential has expired and providing the redesignated current credential.

When the request for accessing the application is received from the user after the first interval has elapsed and before the transmitting the message providing the redesignated current credential, the method may further include: denying access to the application; and transmitting, to the user, the message indicating that the previous current credential has expired and providing the redesignated current credential.

The credential may include a password.

The credential may include a digital token.

The credential may include a public key/private key combination.

The credential may be generated by using a pseudorandom number generator.

The credential may generated by the at least one processor using a pseudorandom number generation algorithm.

The credential may change at least once every 24 hours.

The credential may change at least once every thirty minutes.

The credential may change at least once every ten seconds.

According to another aspect of the present disclosure, a computing apparatus for changing a credential for secure user authentication with respect to user access to an application is provided. The computing apparatus includes a processor, a memory, and a communication interface coupled to each of the processor and the memory. The processor is configured to: receive, from a user via the communication interface, a request for creating an account for accessing the application; transmit, to the user via the communication interface, a response indicating that the account has been created and prompting the user to obtain access to a vault that is configured to periodically generate and change a credential for accessing the application; receive, from the vault, a current credential and a first future credential that is designated as a next credential; transmit, to the user via the communication interface, the current credential; when a request for accessing the application that includes the current credential is received from the user, provide, to the user, access to the application; when a first interval that corresponds to a periodicity of a changing of the credential elapses, receive, from the vault, a message indicating that the current credential has expired and that the next credential has been redesignated as the current credential, and providing a second future credential that has been designated as the next credential; and transmit, to the user via the communication interface, a message indicating that the previous current credential has expired and providing the redesignated current credential.

When the request for accessing the application is received from the user after the first interval has elapsed and before the message providing the redesignated current credential has been transmitted to the user, the processor may be further configured to deny access to the application, and to transmit, to the user via the communication interface, the message indicating that the previous current credential has expired and providing the redesignated current credential.

The credential may include a password.

The credential may include a digital token.

The credential may include a public key/private key combination.

The computing apparatus may further include a pseudorandom number generator configured to generate the credential.

The processor may be further configured to generate the credential by using a pseudorandom number generation algorithm.

The credential may change at least once every 24 hours.

The credential may change at least once every thirty minutes.

The credential may change at least once every ten seconds.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
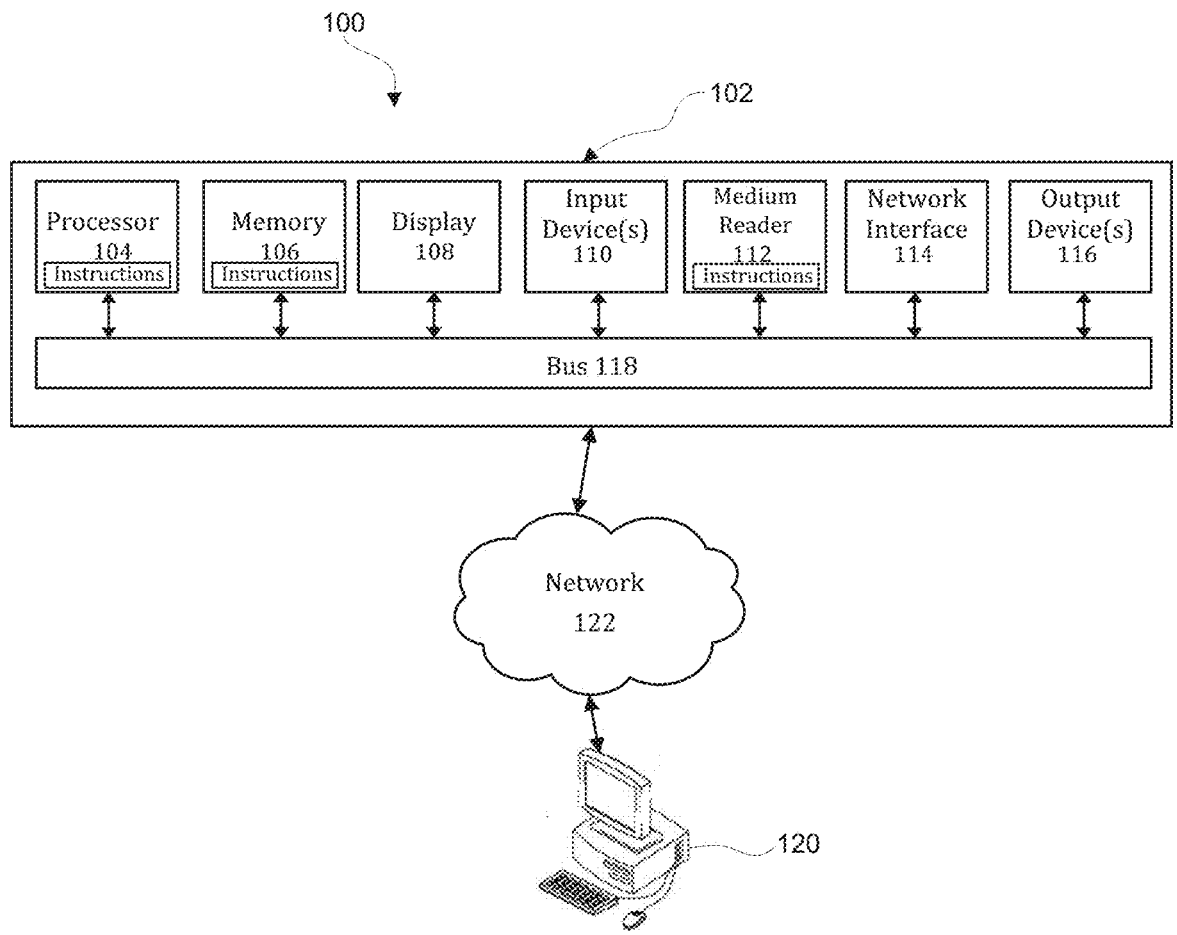
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for generating multiple security credentials, such as passwords, to be used sequentially and provided in advance in order to ensure smooth transitions between successive passwords.

Figure 2:
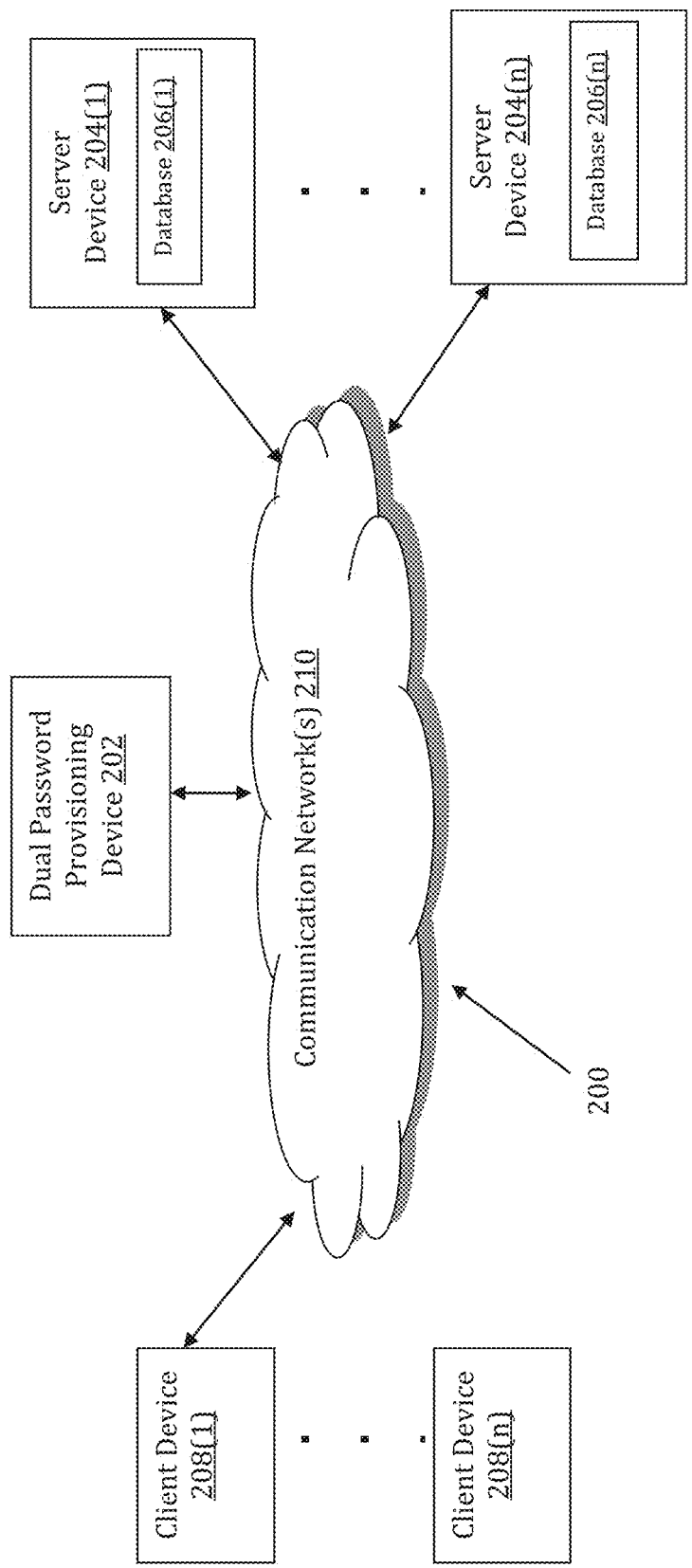
FIG. 2 illustrates an exemplary diagram of a network environment.

Referring to FIG. 2, a schematic of an exemplary network environment 200 for implementing a method for generating multiple security credentials, such as passwords, to be used sequentially and provided in advance in order to ensure smooth transitions between successive passwords is illustrated. In an exemplary embodiment, the method is executable on any networked computer platform, such as, for example, a personal computer (PC).

The method for generating multiple passwords to be used sequentially and provided in advance in order to ensure smooth transitions between successive passwords may be implemented by a Dual Password Provisioning (DPP) device 202. The DPP device 202 may be the same or similar to the computer system 102 as described with respect to FIG. 1. The DPP device 202 may store one or more applications that can include executable instructions that, when executed by the DPP device 202, cause the DPP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPP device 202 itself, may be located in virtual server(s) running in a cloud-based computing environment rather than being tied to one or more specific physical network computing devices. Also, the application(s) may be running in one or more virtual machines (VMs) executing on the DPP device 202. Additionally, in one or more embodiments of this technology, virtual machine(s) running on the DPP device 202 may be managed or supervised by a hypervisor.

In the network environment 200 of FIG. 2, the DPP device 202 is coupled to a plurality of server devices 204(1)-204(n) that hosts a plurality of databases 206(1)-206(n), and also to a plurality of client devices 208(1)-208(n) via communication network(s) 210. A communication interface of the DPP device 202, such as the network interface 114 of the computer system 102 of FIG. 1, operatively couples and communicates between the DPP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPP devices that efficiently implement a method generating multiple passwords to be used sequentially and provided in advance in order to ensure smooth transitions between successive passwords.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPP device 202 may be a standalone device or integrated with one or more other devices or apparatuses, such as one or more of the server devices 204(1)-204(n), for example. In one particular example, the DPP device 202 may include or be hosted by one of the server devices 204(1)-204(n), and other arrangements are also possible. Moreover, one or more of the devices of the DPP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store password data, including historical data regarding previously used passwords and newly generated passwords to be used in the future, and application specific data that relates to various applications that use passwords that are rotated on a regular basis.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DPP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DPP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DPP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPP device 202, the server devices 204(1)-204(n), or the client devices 208(1)-208(n), for example, may be configured to operate as virtual instances on the same physical machine. In other words, one or more of the DPP device 202, the server devices 204(1)-204(n), or the client devices 208(1)-208(n) may operate on the same physical device rather than as separate devices communicating through communication network(s) 210. Additionally, there may be more or fewer DPP devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
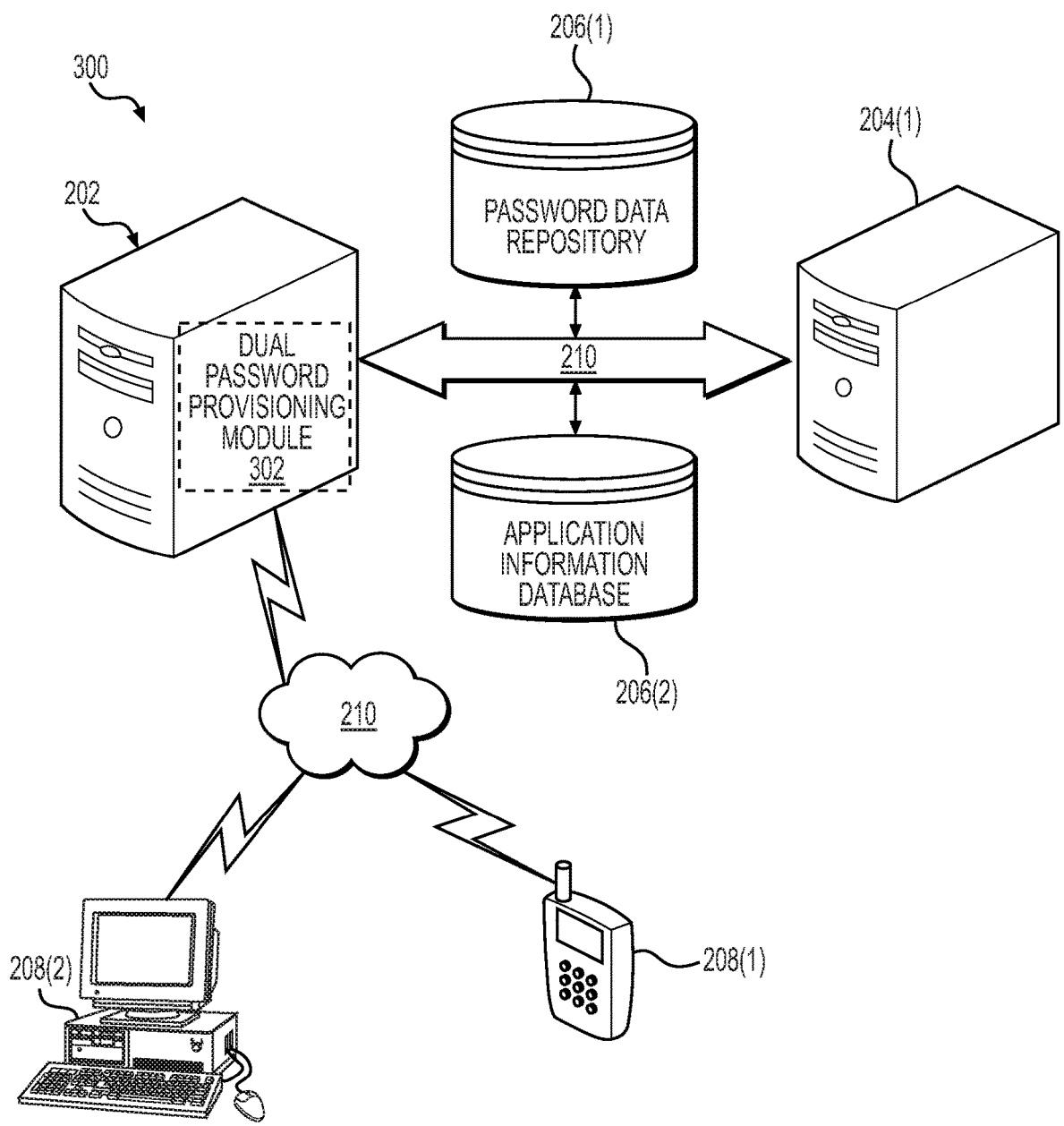
FIG. 3 shows an exemplary system for implementing a method for generating multiple security credentials, such as passwords, to be used sequentially and provided in advance in order to ensure smooth transitions between successive passwords.

The DPP device 202 is described and shown in FIG. 3 as including a dual password provisioning module 302, although it may include other rules, policies, modules, databases, or applications, for example. As will be described below, the dual password provisioning module 302 is configured to implement a method for generating multiple passwords to be used sequentially and provided in advance in order to ensure smooth transitions between successive passwords in an automated, efficient, scalable, and reliable manner.

An exemplary process 300 for implementing a method for generating multiple passwords to be used sequentially and provided in advance in order to ensure smooth transitions between successive passwords by utilizing the network environment of FIG. 2 is shown as being executed in FIG. 3. Specifically, a first client device 208(1) and a second client device 208(2) are illustrated as being in communication with DPP device 202. In this regard, the first client device 208(1) and the second client device 208(2) may be "clients" of the DPP device 202 and are described herein as such. Nevertheless, it is to be known and understood that the first client device 208(1) and/or the second client device 208(2) need not necessarily be "clients" of the DPP device 202, or any entity described in association therewith herein. Any additional or alternative relationship may exist between either or both of the first client device 208(1) and the second client device 208(2) and the DPP device 202, or no relationship may exist.

Further, DPP device 202 is illustrated as being able to access a password data repository 206(1) and an application information database 206(2). The dual password provisioning module 302 may be configured to access these databases for implementing a method for generating multiple passwords to be used sequentially and provided in advance in order to ensure smooth transitions between successive passwords.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPP device 202 via broadband or cellular communication. Of course, these embodiments are merely exemplary and are not limiting or exhaustive.

Upon being started, the dual password provisioning module 302 executes a process for generating multiple security credentials, such as passwords, to be used sequentially and provided in advance in order to ensure smooth transitions between successive passwords. An exemplary process for generating multiple security credentials to be used sequentially and provided in advance in order to ensure smooth transitions between successive credentials is generally indicated at flowchart 400 in FIG. 4.

Figure 4:
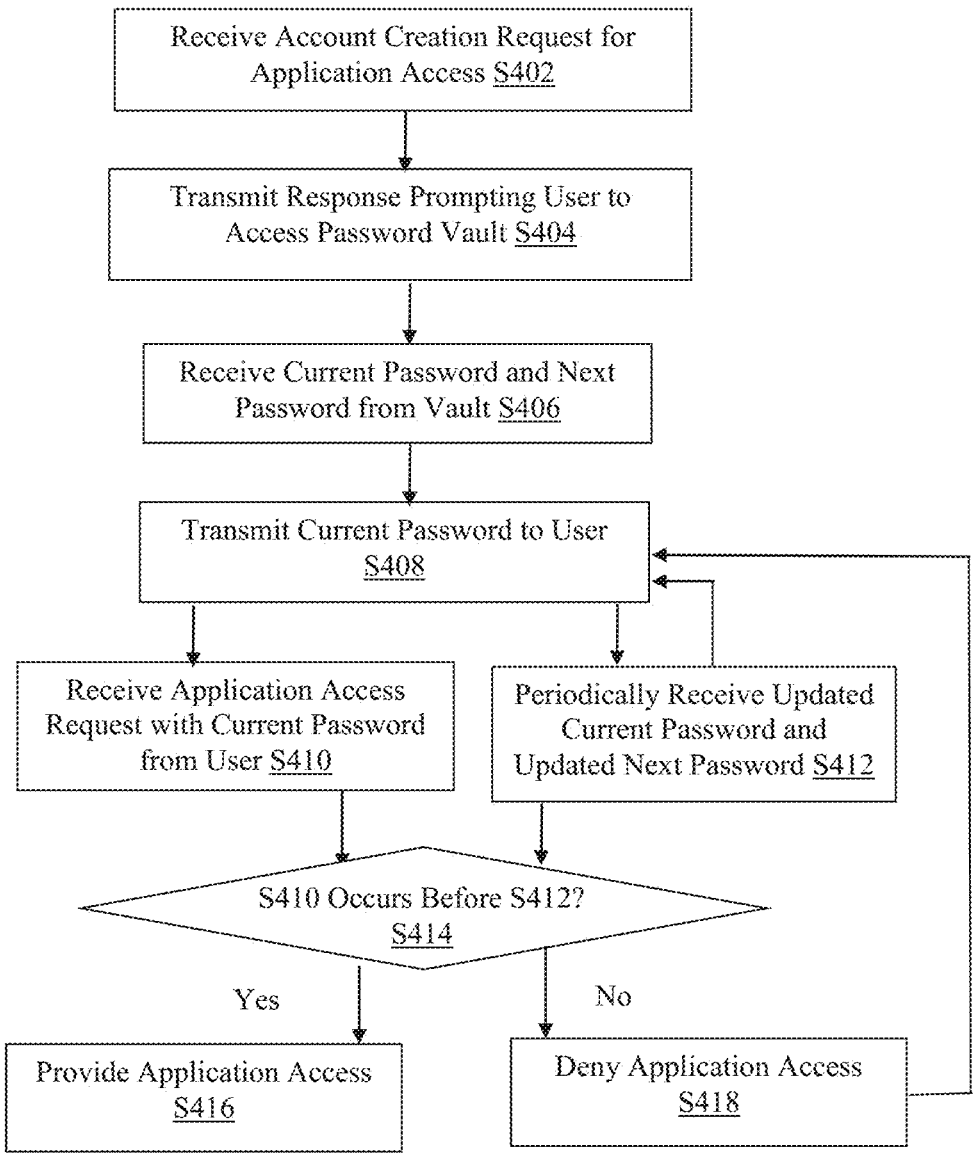
FIG. 4 is a flowchart of an exemplary process for implementing a method for generating multiple security credentials, such as passwords, to be used sequentially and provided in advance in order to ensure smooth transitions between successive passwords.

In the process 400 of FIG. 4, at step S402, the dual password provisioning module 302 receives a user request for creating an account for accessing an application that is accessible by using a security credential, such as a password, that changes periodically. Then, in step S404, the dual password provisioning module 302 transmits a response to the user, indicating that an account has been successfully created and prompting the user to access a vault that periodically generates and stores security credentials. In an exemplary embodiment, the security credential includes a password. However, in alternative embodiments, the security credential may include any one or more of a password, a digital token, a public key/private key combination, any other suitable type of security credential, and/or a combination of any of these types of security credentials.

Figure 5:
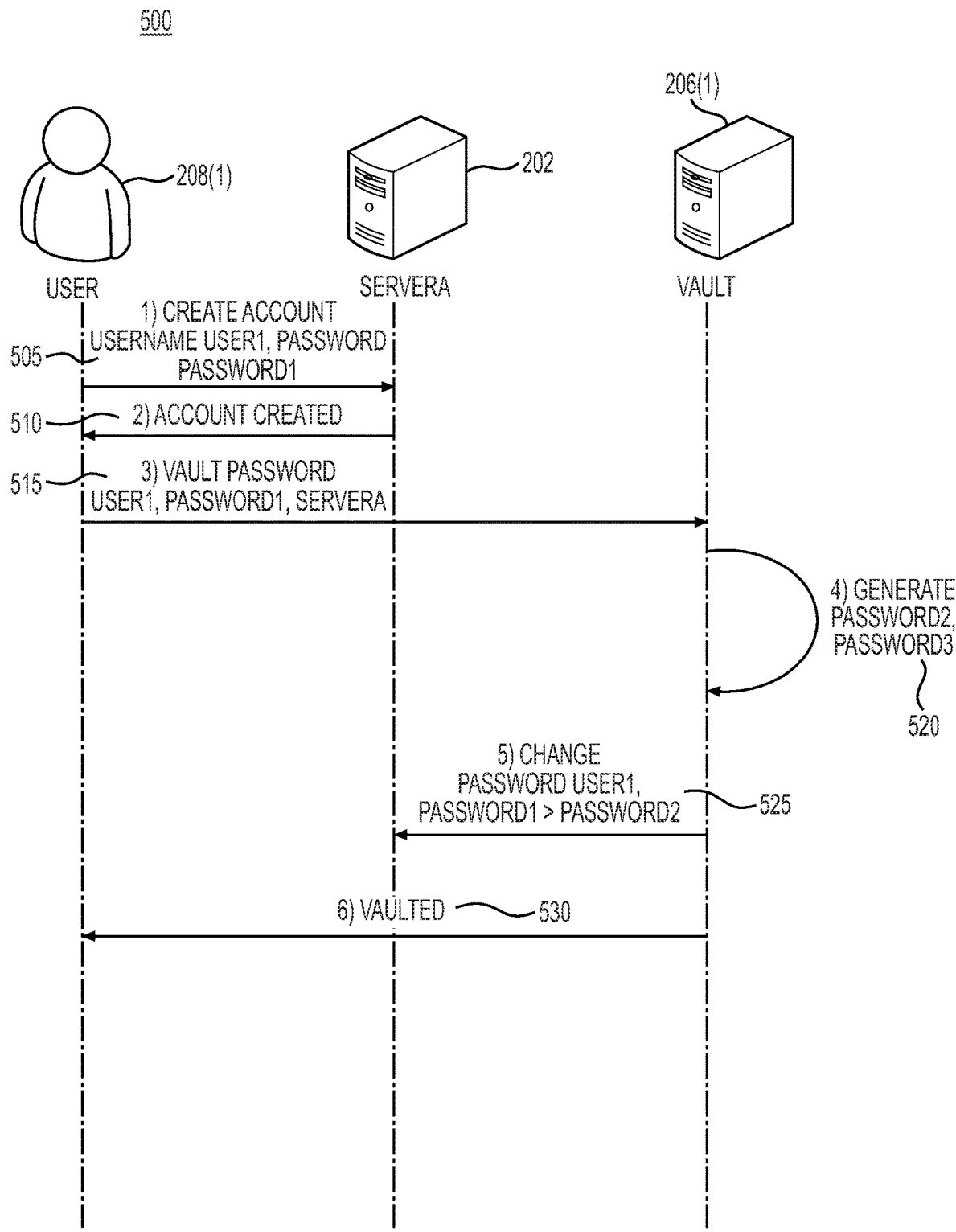
FIG. 5 is a diagram that illustrates a sequence of data flows during a user onboarding process, in accordance with an exemplary embodiment.

Referring also to FIG. 5, a diagram 500 that illustrates a sequence of data flows during a user onboarding process, in accordance with an exemplary embodiment. As illustrated in FIG. 5, in step 505, a user uses a client device 208(1) to transmit a message to DPP device 202 that includes a request for creating an account. The message includes a username and a password. Then, in step 510, DPP device 202 transmits a message to user device 208(1) to indicate that the account has been successfully created. In this aspect, step 505 corresponds to step S402 of FIG. 4, and step 510 corresponds to step S404 of FIG. 4.

Referring again to FIG. 4, in step S406, the dual password provisioning module 302 receives a current password (or other type of credential) and a first future password (or other type of credential) that is designated as a next password to be used for providing access to the application. Referring also to FIG. 5, in step 515, user device 208(1) transmits a message to vault 206(1) that includes a vault password, in order to notify the vault 206(1) that the user has a valid account with DPP device 202, and to prompt the vault 206(1) to generate the current password and the next password. Then, in step 520, the vault 206(1) generates the current password and the next password, and in step 525, the vault 206(1) transmits the two newly generated passwords to DPP device 202. In this aspect, step 525 corresponds to step S406 of FIG. 4.

In an exemplary embodiment, the vault 206(1) may use a pseudorandom number generator to generate the passwords. Alternatively, in another exemplary embodiment, the vault 206(1) may be in communication with a processor that uses a pseudorandom number generation algorithm for generating the passwords.

Finally, at step 530, the vault 206(1) transmits a message to the user device 208(1) to indicate that the user is vaulted, i.e., that the user has been granted limited vault access for the purpose of learning of a current password at any given time.

Referring again to FIG. 4, in step S408, the dual password provisioning module 302 transmits the current password to the user, in order to effectively enable the user to access the application. At step S410, when the user desires to access the application, the dual password provisioning module 302 receives an application access request that includes the current password. At step S414, the dual password provisioning module determines whether the current password as included in the access request is valid, i.e., whether it has been changed prior to notifying the user of the change; and if the current password is deemed to be valid (i.e., Yes as output of step S414), then at step S416, the dual password provisioning module 302 grants application access to the user.

Figure 6:
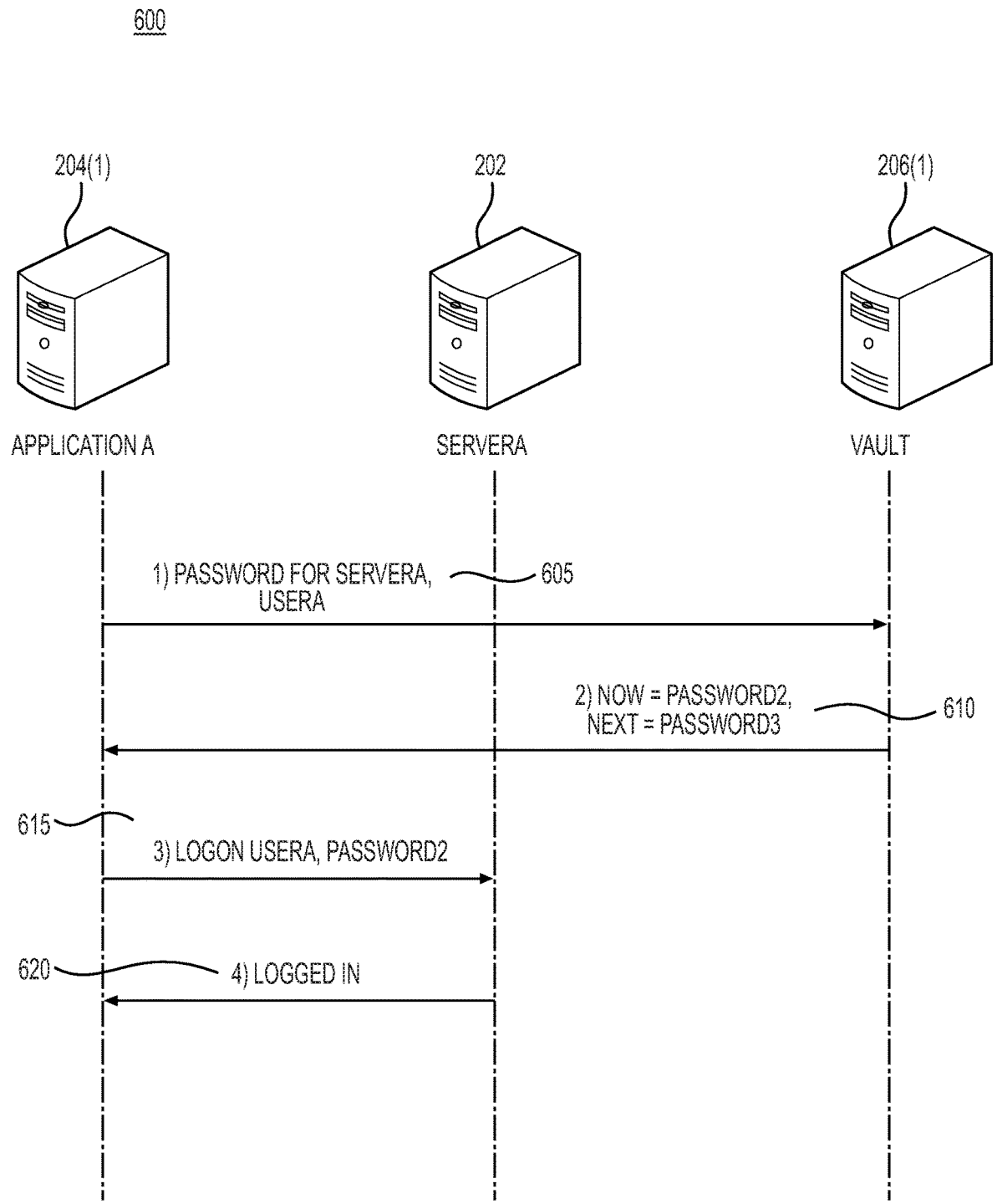
FIG. 6 is a diagram that illustrates a sequence of data flows during a usage of a method for generating multiple security credentials, such as passwords, to be used sequentially and provided in advance in order to ensure smooth transitions between successive passwords, in accordance with an exemplary embodiment.

Referring also to FIG. 6, a diagram 600 illustrates a sequence of data flows during a usage of a method for generating multiple security credentials, such as passwords, to be used sequentially and provided in advance in order to ensure smooth transitions between successive passwords, in accordance with an exemplary embodiment. As illustrated in FIG. 6, in step 605, Application A server 204(1) transmits a message to vault 206(1) that includes user identification and password information, and then, at step 610, having generated a current password and a next password in step 520 of FIG. 5, the vault 206(1) transmits the current password and the next password to Application A server 204(1). Then, when Application A server 204(1) receives a request for user access that includes the current password, at step 615, Application A server 204(1) forwards the access request with current password to DPP device 202. Finally, at step 620, the DPP device determines that the current password is valid, and transmits a message to Application A server 204(1) to grant user access to the application. In this aspect, step 615 corresponds to step S410 of FIG. 4, and step 620 corresponds to step S414 of FIG. 4.

Referring again to FIG. 4, at step S412, the dual password provisioning module 302 periodically receives an updated current password and an updated next password. In an exemplary embodiment, the periodicity of the changing of the password may correspond to the application requiring a new password at least once every 180 days; at least once every 24 hours; at least once every 30 minutes; at least once every ten seconds; or at least once every suitable predetermined amount of time. When this occurs, the dual password provisioning module 302 then returns to step S408, in order to provide the newly updated current password to the user.

However, there may occasionally be a situation in which the current password has been updated at step S412, but before the updated current password is notified to the user at step S408, the user may request access to the application by using the previous version of the current password (i.e., the old password). In such a situation, at step S414, the dual password provisioning module 302 determines that the password provided in conjunction with the access request is not valid (i.e., No as output of step S414), and then, at step S418, the user request for access to the application is denied. The dual password provisioning module 302 then returns to step S408, in order to ensure that the newly updated current password is provided to the user, thereby enabling the user to submit a newly updated access request that includes the valid current password at step S410.

Figure 7:
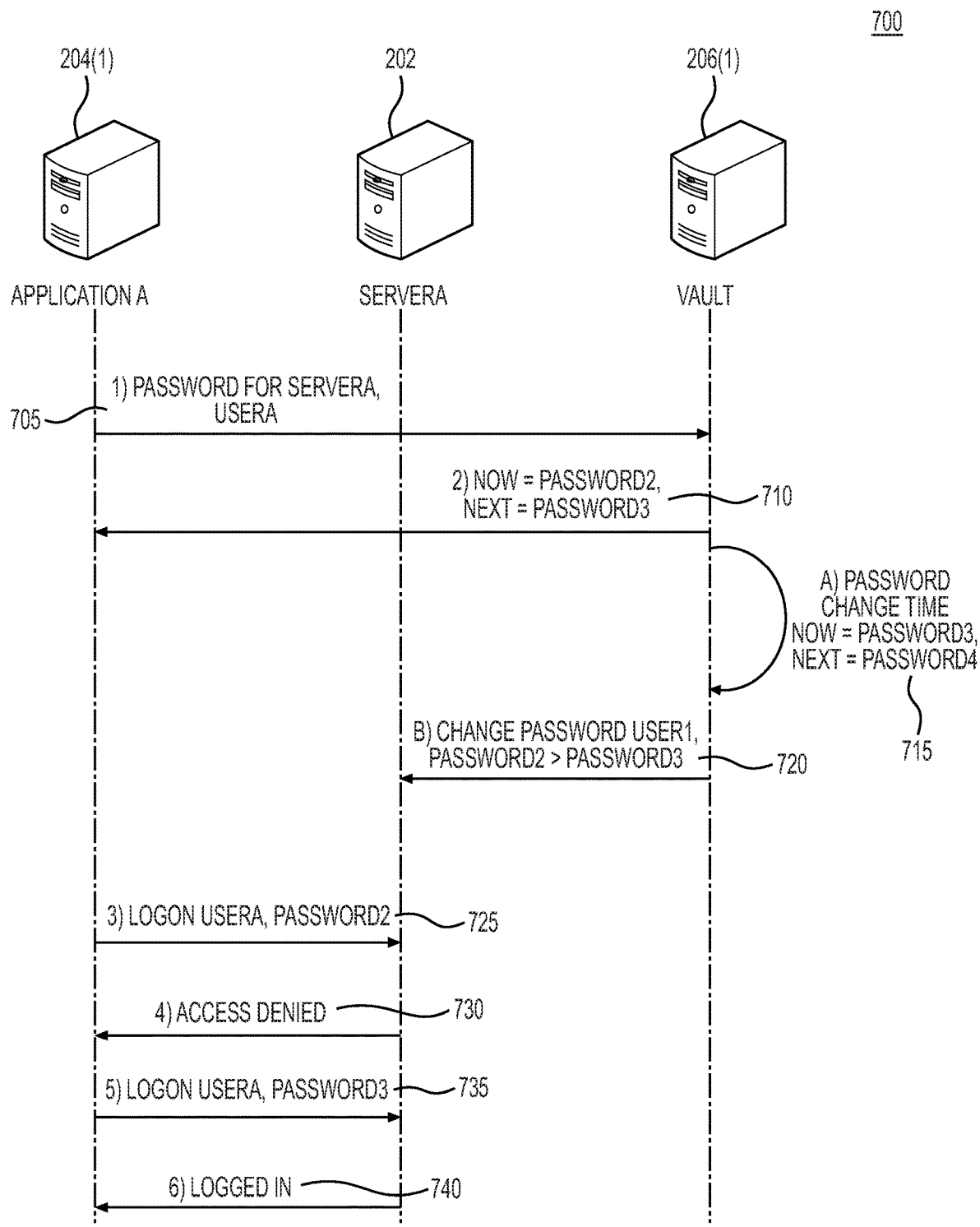
FIG. 7 is a diagram that illustrates a sequence of data flows during a usage of the method illustrated in FIG. 6 when the security credential has been changed and a user has requested application access prior to being notified of the changed security credential, in accordance with an exemplary embodiment.

Referring also to FIG. 7, a diagram 700 illustrates a sequence of data flows during a usage of the method illustrated in FIG. 6 when the security credential has been changed and a user has requested application access prior to being notified of the changed security credential, in accordance with an exemplary embodiment. As illustrated in FIG. 7, in step 705, Application A server 204(1) transmits a message to vault 206(1) that includes user identification and password information, and then, at step 710, having generated a current password and a next password in step 520 of FIG. 5, the vault 206(1) transmits the current password and the next password to Application A server 204(1). In this aspect, step 705 of FIG. 7 is identical to step 605 of FIG. 6, and step 710 of FIG. 7 is identical to step 610 of FIG. 6.

Then, when a time interval that corresponds to the periodicity at which the password is to be changed (i.e., password change time), at step 715, the vault 206(1) invalidates the previous version of the current password, redesignates the previous version of the next password as the new version of the current password, and generates another password that is designated as the new version of the next password. The vault 206(1) then notifies DPP device 202 of the updated current password and the updated next password at step 720.

In the situation illustrated in FIG. 7, before DPP device 202 has notified the user of the update to the current password, the user has submitted an access request with the now-invalid old password, and at step 725, this request is forwarded from Application A server 204(1) to DPP device 202. In this aspect, step 725 of FIG. 7 is similar to step 615 of FIG. 6, but the difference is that in step 725, the password included with the request is not valid. As a result, at step 730, DPP device 202 transmits a message to Application A server 204(1) to indicate that user access to the application is denied. In this regard, step 730 of FIG. 7 corresponds to step S418 of FIG. 4.

After access is denied, the DPP device 202 notifies the user of the updated current password, thereby enabling the user to submit a new access request that includes the correct, valid version of the current password. As a result, at step 735, Application A server 204(1) forwards the new access request to the DPP device 202, and at step 740, the DPP device determines that the current password is valid, and transmits a message to Application A server 204(1) to grant user access to the application. In this aspect, step 735 corresponds to step S410 of FIG. 4, and step 740 corresponds to step S414 of FIG. 4.

Accordingly, with this technology, an optimized process for implementing methods and systems for generating multiple security credentials, such as passwords, to be used sequentially and provided in advance in order to ensure smooth transitions between successive passwords is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for changing a credential for secure user authentication, the method being implemented by at least one processor that is configured to facilitate user access to an application, the method comprising:

receiving, from a user, a request for creating an account for accessing the application;

transmitting, to the user, a response indicating that the account has been created and prompting the user to obtain access to a vault that is configured to periodically generate and change a credential for accessing the application;

receiving, from the vault, a current credential and a first future credential that is designated as a next credential;

transmitting, to the user, the current credential;

when a request for accessing the application that includes the current credential is received from the user, providing, to the user, access to the application;

when a first interval that corresponds to a periodicity of a changing of the credential elapses, receiving, from the vault, a message indicating that the current credential has expired and that the next credential has been redesignated as the current credential, and providing a second future credential that has been designated as the next credential; and transmitting, to the user, a message indicating that the previous current credential has expired and providing the redesignated current credential.

2. The method of claim 1, wherein when the request for accessing the application is received from the user after the first interval has elapsed and before the transmitting the message providing the redesignated current credential, the method further includes:

denying access to the application; and transmitting, to the user, the message indicating that the previous current credential has expired and providing the redesignated current credential.

3. The method of claim 1, wherein the credential includes a password.

4. The method of claim 1, wherein the credential includes a digital token.

5. The method of claim 1, wherein the credential includes a public key/private key combination.

6. The method of claim 1, wherein the credential is generated by using a pseudorandom number generator.

7. The method of claim 1, wherein the credential is generated by the at least one processor using a pseudorandom number generation algorithm.

8. The method of claim 1, wherein the credential changes at least once every 24 hours.

9. The method of claim 1, wherein the credential changes at least once every thirty minutes.

10. The method of claim 1, wherein the credential changes at least once every ten seconds.

11. A computing apparatus for changing a credential for secure user authentication with respect to user access to an application, the computing apparatus comprising:

a processor;

a memory; and a communication interface coupled to each of the processor and the memory, wherein the processor is configured to:

receive, from a user via the communication interface, a request for creating an account for accessing the application;

transmit, to the user via the communication interface, a response indicating that the account has been created and prompting the user to obtain access to a vault that is configured to periodically generate and change a credential for accessing the application;

receive, from the vault, a current credential and a first future credential that is designated as a next credential;

transmit, to the user via the communication interface, the current credential;

when a request for accessing the application that includes the current credential is received from the user, provide, to the user, access to the application;

when a first interval that corresponds to a periodicity of a changing of the credential elapses, receive, from the vault, a message indicating that the current credential has expired and that the next credential has been redesignated as the current credential, and providing a second future credential that has been designated as the next credential; and transmit, to the user via the communication interface, a message indicating that the previous current credential has expired and providing the redesignated current credential.

12. The computing apparatus of claim 11, wherein when the request for accessing the application is received from the user after the first interval has elapsed and before the the message providing the redesignated current credential has been transmitted to the user, the processor is further configured to deny access to the application, and to transmit, to the user via the communication interface, the message indicating that the previous current credential has expired and providing the redesignated current credential.

13. The computing apparatus of claim 11, wherein the credential includes a password.

14. The computing apparatus of claim 11, wherein the credential includes a digital token.

15. The computing apparatus of claim 11, wherein the credential includes a public key/private key combination.

16. The computing apparatus of claim 11, further comprising a pseudorandom number generator configured to generate the credential.

17. The computing apparatus of claim 11, wherein the processor is further configured to generate the credential by using a pseudorandom number generation algorithm.

18. The computing apparatus of claim 11, wherein the credential changes at least once every 24 hours.

19. The computing apparatus of claim 11, wherein the credential changes at least once every thirty minutes.

20. The computing apparatus of claim 11, wherein the credential changes at least once every ten seconds.

* * * * *